United States Patent
Chan et al.

(10) Patent No.: US 8,465,325 B1
(45) Date of Patent: Jun. 18, 2013

(54) CONNECTOR

(75) Inventors: Ching-Jung Chan, New Taipei (TW); Chih-Chiang Lin, New Taipei (TW)

(73) Assignee: Proconn Technology Co., Ltd., New Taipei (TW)

(*) Notice: Subject to any disclaimer, the term of this patent is extended or adjusted under 35 U.S.C. 154(b) by 0 days.

(21) Appl. No.: 13/405,236

(22) Filed: Feb. 25, 2012

(51) Int. Cl.
*H01R 24/00* (2011.01)

(52) U.S. Cl.
USPC .......................................................... 439/630

(58) Field of Classification Search
USPC .................................... 439/630, 159, 607.33
See application file for complete search history.

(56) References Cited

U.S. PATENT DOCUMENTS

| | | | | |
|---|---|---|---|---|
| 7,726,991 | B2 * | 6/2010 | Ma et al. | 439/188 |
| 8,038,477 | B2 * | 10/2011 | Zhang | 439/630 |
| 8,287,293 | B1 * | 10/2012 | Gao et al. | 439/159 |
| 8,376,764 | B1 * | 2/2013 | Su et al. | 439/157 |

* cited by examiner

*Primary Examiner* — Phuong Dinh

(57) ABSTRACT

A card connector includes an insulating housing defining a receiving chamber, and electrical terminals disposed in the insulating housing. A fool-proofing device includes a fool-proofing board with top edges of a front thereof designed with slopes, and two lifting members disposed in two sides of the receiving chamber with elastic portions thereof projecting upward in the receiving chamber to prop the fool-proofing board over the receiving chamber, wherein the fool-proofing board can be pressed downward into the receiving chamber by a SIM card under the guiding of the slopes, or move rearward under the drive of a micro SIM card of which a rear is inserted in the front of the fool-proofing board. An ejection device is assembled in the insulating housing for ejecting the cards out of the card connector. A shielding shell is covered on the insulating housing.

8 Claims, 4 Drawing Sheets

CONNECTOR

BACKGROUND OF THE INVENTION

1. Field of the Invention

The present invention relates to a card connector, and more particularly to a card connector capable of inserting two kinds of different cards therein.

2. The Related Art

Generally, a card connector is often assembled in a portable electronic product such as a mobile phone and a digital camera etc, so as to achieve some functions of the electronic product, such as data processing, data sharing and so on. With the development of diversifying the functions of the electronic products, SIM cards adapted for being inserted in the card connectors need different specifications and sizes to meet customer requirements and actual use demands, such as common SIM cards or micro SIM cards.

In order to make the electronic product capable of receiving the different specifications and sizes of SIM cards therein, a multi card connector came with the tide of fashion. Traditionally, the multi card connector often realizes the capability of receiving the common SIM card and the micro SIM card therein, by means of opening two different sizes of receiving chambers in an insulating housing of the multi card connector. In detail, the receiving chambers are apart opened in a top and a bottom of the insulating housing, or in a left side and a right side of the insulating housing, for receiving the common SIM card and the micro SIM card respectively. Furthermore, each receiving chamber has a group of electrical terminals arranged therein to connect with the corresponding SIM card.

However, because the electronic products develop towards the miniaturization direction more and more, but the above-mentioned multi card connector has too large volume and too complex structure to fail to meet the miniaturization requirement of the electronic product. Furthermore, it increases difficulty and cost of processing the electronic product. Therefore, a card connector capable of overcoming the foregoing problems is required.

SUMMARY OF THE INVENTION

An object of the present invention is to provide a card connector, which is adapted for receiving a SIM card and a micro SIM card therein. The card connector includes an insulating housing which has a base board, two side walls and a blocking wall protruding upward from two opposite side edges and a rear edge of the base board respectively. A receiving space is surrounded among the base board, the side walls and the blocking wall. A substantial middle of a top side of the base board is further concaved downward to form a receiving chamber. The base board defines a plurality of terminal fillisters arranged in front of the receiving chamber and communicating with the receiving space. A plurality of electrical terminals is disposed in the base board. Each electrical terminal has a contact portion projecting into the receiving space through the corresponding terminal fillister. A fool-proofing device includes a fool-proofing board and at least two lifting members disposed in two opposite sides of a bottom wall of the receiving chamber. Each lifting member has at least one elastic portion projecting upward in the receiving chamber. The fool-proofing board has a shape in accordance with the receiving chamber and defines an inserting mouth in a substantial middle of a front thereof. Top edges of other two parts of a front end of the fool-proofing board are cut off to form a pair of slopes. The fool-proofing board is movably located over the receiving chamber by virtue of the elastic portions elastically propping against a bottom thereof. An ejection device is assembled in one side wall and further projects into the receiving space for ejecting the cards out of the card connector. A shielding shell is covered on the insulating housing to restrain the fool-proofing board between the shielding shell and the elastic portions of the lifting members. In use, the SIM card is inserted rearward in the receiving space to electrically contact with the contact portions of the electrical terminals by virtue of pressing the fool-proofing board downward into the receiving chamber under the guiding of the slopes. A rear of the micro SIM card is inserted rearward into the inserting mouth and further pushes the fool-proofing board to slide rearward in the receiving space so as to realize an electrical connection between the micro SIM card and the contact portions of the electrical terminals. The fool-proofing board can move back over the receiving chamber under the ejection action of the ejection device to further eject the micro SIM card out of the card connector.

As described above, the fool-proofing board is movably located over the receiving chamber by virtue of the elastic portions elastically propping against the bottom thereof. When the SIM card is inserted into the card connector, the SIM card presses the fool-proofing board downward into the receiving chamber under the guiding of the slopes. When the micro SIM card is inserted into the card connector, the rear of the micro SIM card is inserted in the inserting mouth and then pushes the fool-proofing board to slide rearward in the receiving space. So, the card connector of the present invention has a smaller volume and a simple structure to meet the miniaturization requirement and reduce the manufacture cost thereof.

BRIEF DESCRIPTION OF THE DRAWINGS

The present invention will be apparent to those skilled in the art by reading the following description with reference to the attached drawings, in which.

DETAILED DESCRIPTION OF THE PREFERRED EMBODIMENT

Figure 3:
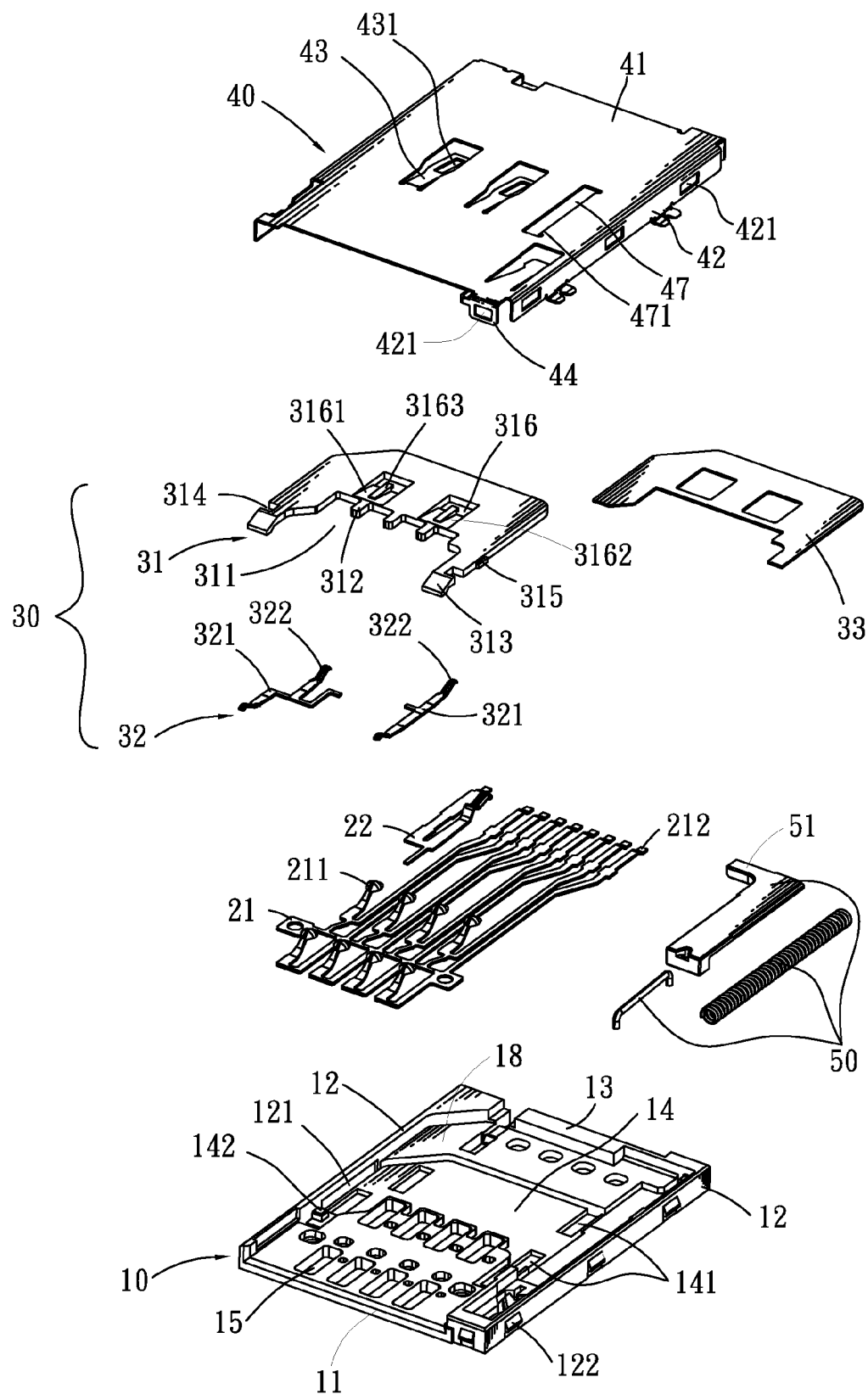
FIG. 3 is a completely exploded view of the card connector of FIG. 1.
Figure 4:
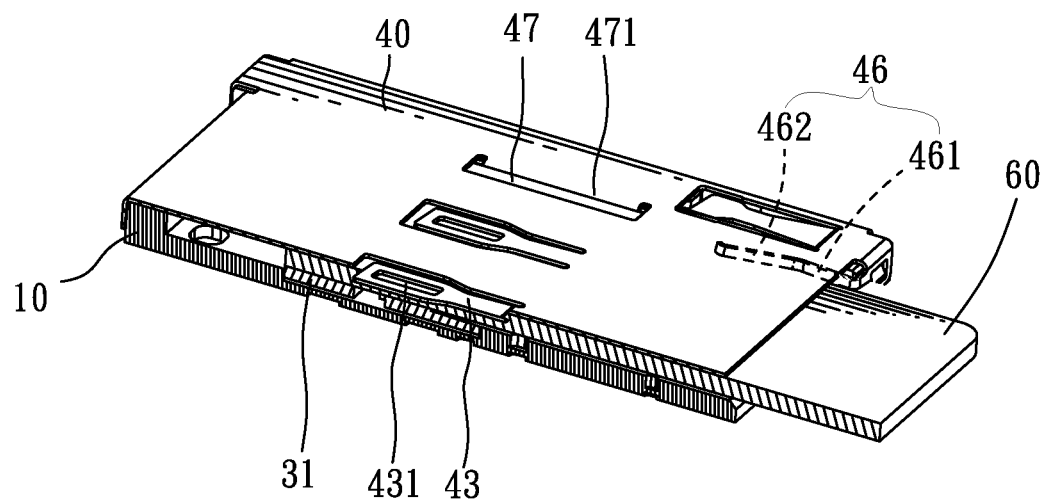
FIG. 4 is a use sectional view of the card connector of FIG. 1, in which a SIM card is inserted.
Figure 5:
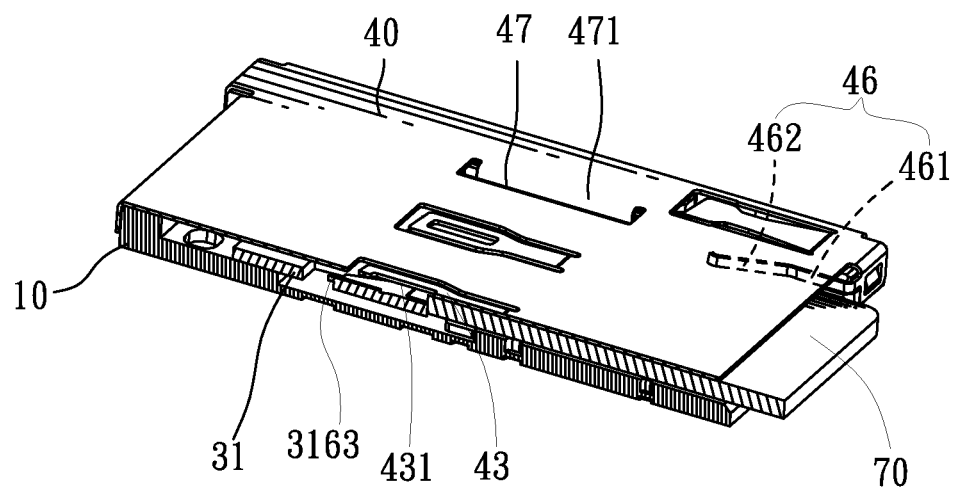
FIG. 5 is another use sectional view of the card connector of FIG. 1, in which a micro SIM card is inserted.

Referring to FIGS. 3-5, a card connector according to an embodiment of the present invention is adapted for receiving a SIM card 60 and a micro SIM card 70 therein. The card connector includes an insulating housing 10, a plurality of electrical terminals 21, a fool-proofing device 30, an ejection device 50 and a shielding shell 40.

Figure 2:
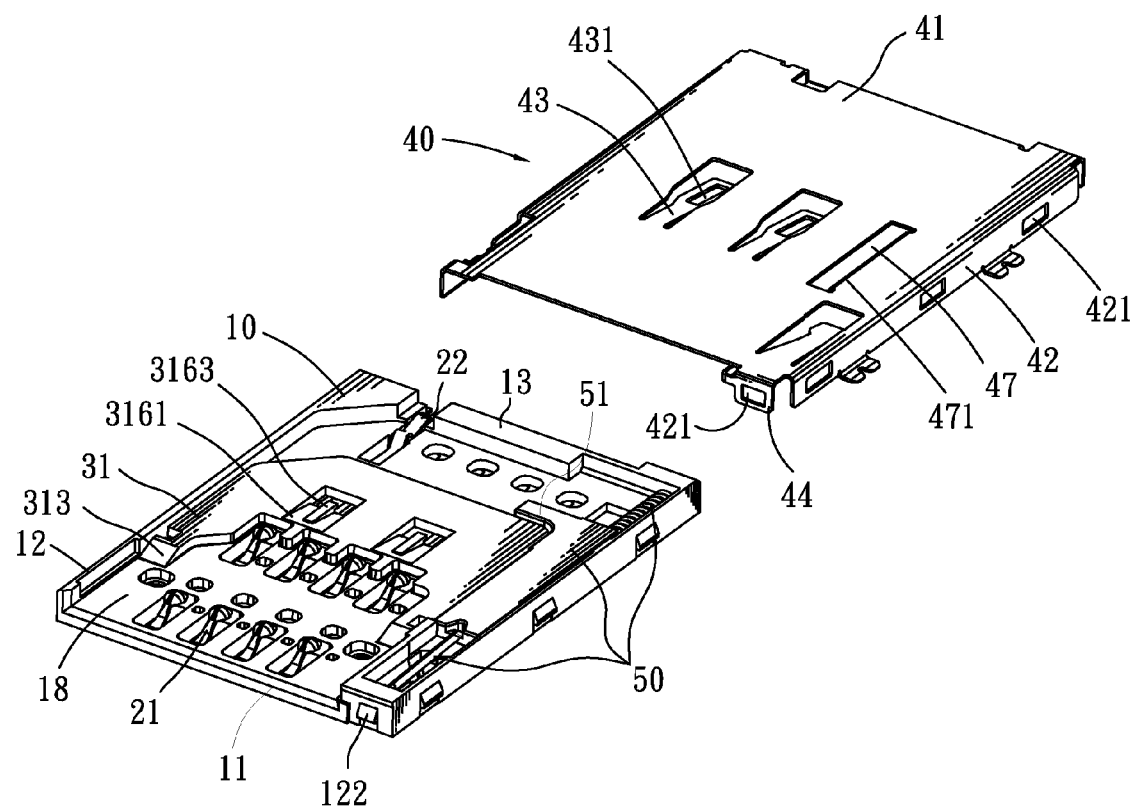
FIG. 2 is a partially exploded view of the card connector of FIG. 1.

Referring to FIG. 2 and FIG. 3, the insulating housing 10 has a base board 11, two side walls 12 and a blocking wall 13 protruding upward from two opposite side edges and a rear edge of the base board 11 respectively. A receiving space 18 is surrounded among the base board 11, the side walls 12 and the blocking wall 13. A substantial middle of a top side of the base board 11 is further concaved downward to form a receiving chamber 14. The base board 11 defines a plurality of terminal fillisters 15 arranged in front of the receiving chamber 14 and communicating with the receiving space 18. The electrical terminals 21 are disposed in the base board 11. Each electrical terminal 21 has a contact portion 211 which projects into the receiving space 18 through the corresponding terminal fillister 15, and a soldering tail 212 which stretches behind the blocking wall 13.

Figure 1:
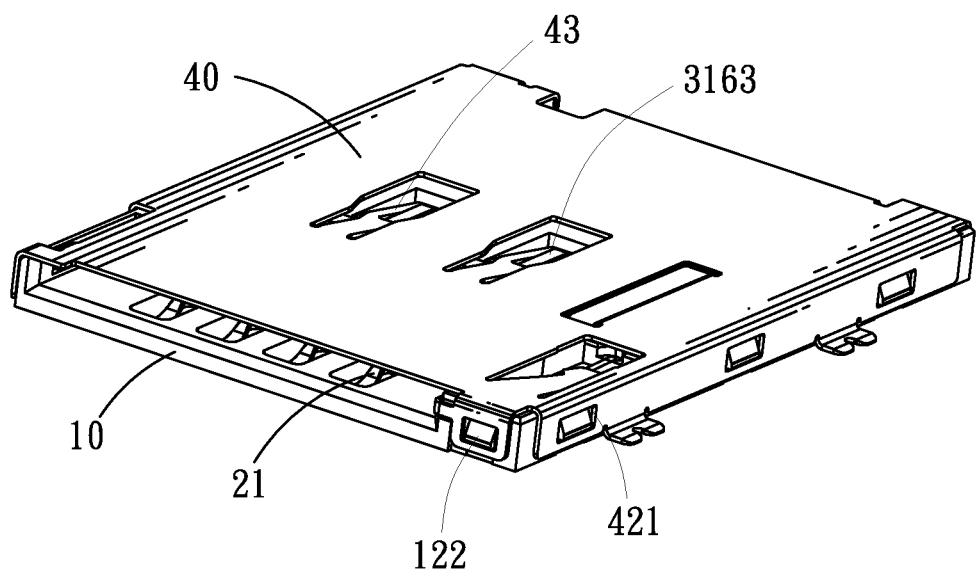
FIG. 1 is an assembled perspective view of a card connector in accordance with an embodiment of the present invention.

Referring to FIGS. 1-3, the fool-proofing device 30 includes a fool-proofing board 31 and at least two lifting members 32 disposed in two opposite sides of a bottom wall of the receiving chamber 14. Each lifting member 32 has at least one elastic portion 322 projecting upward in the receiving chamber 14. The fool-proofing board 31 has a shape in accordance with the receiving chamber 14 and defines an inserting mouth 311 in a substantial middle of a front thereof. Top edges of other two parts of a front end of the fool-proofing board 31 are cut off to form a pair of slopes 313. The fool-proofing board 31 is movably located over the receiving chamber 14 by virtue of the elastic portions 322 elastically propping against a bottom thereof. The ejection device 50 is assembled in one side wall 12 and further projects into the receiving space 18 for ejecting the cards 60, 70 out of the card connector. The shielding shell 40 is covered on the insulating housing 10 to restrain the fool-proofing board 31 between the shielding shell 40 and the elastic portions 322 of the lifting members 32.

Referring to FIG. 4 and FIG. 5, in use, the SIM card 60 is inserted rearward in the receiving space 18 of the insulating housing 10 to electrically contact with the contact portions 211 of the electrical terminals 21 by virtue of pressing the fool-proofing board 31 downward into the receiving chamber 14 under the guiding of the slopes 313. A rear of the micro SIM card 70 is inserted rearward into the inserting mouth 311 and further pushes the fool-proofing board 31 to slide rearward in the receiving space 18 so as to realize an electrical connection between the micro SIM card 70 and the contact portions 211 of the electrical terminals 21. The fool-proofing board 31 can move back over the receiving chamber 14 under the ejection action of the ejection device 50 to further eject the micro SIM card 70 out of the card connector.

Referring to FIGS. 1-3 again, the receiving chamber 14 of the insulating housing 10 adjoins two face-to-face inner sides of the side walls 12. The inner side of the other side wall 12 defines a positioning slot 121 extending a front-to-rear direction thereof and connecting with one side of the receiving chamber 14 opposite to the ejection device 50. The shielding shell 40 has a top plate 41 covered on the insulating housing 10 and defining a window 47 at one side thereof close to the ejection device 50. One longitudinal inner sidewall of the window 47 extends downward to form a positioning plate 471. Two opposite side edges of the fool-proofing board 31 oppositely protrude sideward to form a pair of positioning ears 315 of which one is located in the positioning slot 121 and the other is restricted under the positioning plate 471 so that assures up-and-down and back-and-forth movements of the fool-proofing board 31.

Referring to FIGS. 1-5 again, a pair of openings 316 is opened in the fool-proofing board 31 and transversely arranged behind the inserting mouth 311. A front sidewall of each opening 316 protrudes rearward to form a supporting block 3161 with a top face 3162 thereof inclining downward from front to rear. A buckling rib 3163 protrudes upward from a middle of the top face 3162 of the supporting block 3161 and extends longitudinally to further project rearward into the opening 316. The top plate 41 of the shielding shell 40 is die-cut downward to form a pair of buckling slices 43 slanting against the top faces 3162 of the supporting blocks 3161 respectively. Each of the buckling slices 43 defines a buckling hole 431. The buckling rib 3163 stretches in the corresponding buckling hole 431 and is adapted for buckling with the buckling hole 431 to avoid mis-inserting the cards 60, 70 in the card connector. In detail, in the process of inserting the SIM card 60 into the card connector, the SIM card 60 props the buckling slices 43 upward to separate the buckling ribs 3163 from the buckling holes 431, and presses the fool-proofing board 31 downward to slide onto the fool-proofing board 31 under the guiding of the slopes 313. After the fool-proofing board 31 is completely pressed in the receiving chamber 14, the SIM card 60 further pushes the ejection device 50 rearward so as to complete the insertion action of the SIM card 60. In the process of inserting the micro SIM card 70 into the card connector, the rear of the micro SIM card 70 is inserted in the inserting mouth 311 to push rearward the fool-proofing board 31. In the meanwhile, the micro SIM card 70 props the buckling slices 43 upward to separate the buckling ribs 3163 from the buckling holes 431, then the fool-proofing board 31 further pushes the ejection device 50 rearward by virtue of the drive of the micro SIM card 70 so as to complete the insertion action of the micro SIM card 70.

A pair of positioning bumps 142 protrudes on the two opposite sides of the bottom wall of the receiving chamber 14. The two opposite side edges of the fool-proofing board 31 define two positioning gaps 314 for holding the positioning bumps 142 therein so as to position the fool-proofing board 31 in the receiving chamber 14 when the fool-proofing board 31 is pressed downward in the receiving chamber 14 by the SIM card 60. The fool-proofing device 30 further includes a strengthening plate 33 made of solid metal material and integrated in the fool-proofing board 31 to strengthen the strength of the fool-proofing board 31. The lifting member 32 has a fastening portion 321 of a substantially long strip shape, and two free ends thereof are curved upward to form a pair of the elastic portions 322. The fastening portions 321 are molded in the base board 11. The two opposite sides of the bottom wall of the receiving chamber 14 respectively define a pair of receiving fillisters 141 for receiving the corresponding elastic portions 322 therein when the fool-proofing board 31 is pressed in the receiving chamber 14. A rear sidewall of the inserting mouth 311 of the fool-proofing board 31 protrudes forward to form a plurality of boosting portions 312 for resisting against the rear end of the micro SIM card 70.

Referring to FIG. 3, the ejection device 50 has an ejection portion 51 stretching sideward in the receiving space 18 of the insulating housing 10. The ejection portion 51 resists against a back of the fool-proofing board 31 or a back of the SIM card 60 so as to eject the micro SIM card 70 out of the card connector by virtue of the fool-proofing board 31 or eject the SIM card 60 out of the card connector directly. The shielding shell 40 further has two side plates 42 extending downward from two opposite side edges of the top plate 41 to abut against two opposite outer sides of the side walls 12. A front edge of one side of the top plate 41 protrudes downward to form a holding plate 44 resisting against a front end of the one side wall 12. The two opposite outer sides of the side walls 12 and the front end of the one side wall 12 protrude outward to form a plurality of fastening blocks 122. A plurality of fastening holes 421 is opened in the side plates 42 and the holding plate 44 for buckling the corresponding fastening blocks 122 therein.

Referring to FIGS. 2-5, the shielding shell 40 further has two restraining members 46 of which each has a base strip 461 and an elastic arm 462 extending rearward from a rear end of the base strip 461 and inclined inward to stretch into the receiving space 18. A front end of the base strip 461 of one restraining member 46 is connected with a side edge of the holding plate 44, and a top edge of the base strip 461 of the other restraining member 46 is connected with a front of the other side of the top plate 41. In the process of inserting the SIM card 60 and the micro SIM card 70 into the card connector, the elastic arms 462 of the restraining members 46 resist against two opposite side edges of the cards 60, 70 to guide the movement of the cards 60, 70 along the normal track, especially guide the micro SIM card 70 to be smoothly inserted into the inserting mouth 311 of the fool-proofing board 31. The card connector further includes a monitoring terminal 22 molded in a rear of the base board 11 for monitoring whether the cards 60, 70 are inserted in place in the card connector.

As described above, the fool-proofing board 31 is movably located over the receiving chamber 14 by virtue of the elastic portions 322 elastically propping against the bottom thereof. When the SIM card 60 is inserted into the card connector, the SIM card 60 presses the fool-proofing board 31 downward into the receiving chamber 14 under the guiding of the slopes 313. When the micro SIM card 70 is inserted into the card connector, the rear of the micro SIM card 70 is inserted in the inserting mouth 311 and then pushes the fool-proofing board 31 to slide rearward in the receiving space 18. So, the card connector of the present invention has a smaller volume and a simple structure to meet the miniaturization requirement and reduce the manufacture cost thereof.

What is claimed is:

1. A card connector adapted for receiving a SIM card and a micro SIM card therein, comprising:
   an insulating housing having a base board, two side walls and a blocking wall protruding upward from two opposite side edges and a rear edge of the base board respectively, a receiving space being surrounded among the base board, the side walls and the blocking wall, a substantial middle of a top side of the base board being further concaved downward to form a receiving chamber, the base board defining a plurality of terminal fillisters arranged in front of the receiving chamber and communicating with the receiving space;
   a plurality of electrical terminals disposed in the base board, each electrical terminal having a contact portion which projects into the receiving space through the corresponding terminal fillister;
   a fool-proofing device including a fool-proofing board and at least two lifting members disposed in two opposite sides of a bottom wall of the receiving chamber, each lifting member having at least one elastic portion projecting upward in the receiving chamber, the fool-proofing board having a shape in accordance with the receiving chamber and defining an inserting mouth in a substantial middle of a front thereof, top edges of other two parts of a front end of the fool-proofing board being cut off to form a pair of slopes, the fool-proofing board being movably located over the receiving chamber by virtue of the elastic portions elastically propping against a bottom thereof;
   an ejection device assembled in one side wall and further projecting into the receiving space for ejecting the cards out of the card connector; and
   a shielding shell covered on the insulating housing to restrain the fool-proofing board between the shielding shell and the elastic portions of the lifting members,
   wherein the SIM card is inserted rearward in the receiving space to electrically contact with the contact portions of the electrical terminals by virtue of pressing the fool-proofing board downward into the receiving chamber under the guiding of the slopes, a rear of the micro SIM card is inserted rearward into the inserting mouth and further pushes the fool-proofing board to slide rearward in the receiving space so as to realize an electrical connection between the micro SIM card and the contact portions of the electrical terminals, the fool-proofing board can move back over the receiving chamber under the ejection action of the ejection device to further eject the micro SIM card out of the card connector.

2. The card connector as claimed in claim 1, wherein the receiving chamber adjoins two face-to-face inner sides of the side walls, the inner side of the other side wall defines a positioning slot extending a front-to-rear direction thereof and connecting with one side of the receiving chamber opposite to the ejection device, the shielding shell has a top plate covered on the insulating housing and defining a window at one side thereof close to the ejection device, one longitudinal inner sidewall of the window extends downward to form a positioning plate, two opposite side edges of the fool-proofing board oppositely protrude sideward to form a pair of positioning ears of which one is located in the positioning slot and the other is restricted under the positioning plate so that assures up-and-down and back-and-forth movements of the fool-proofing board.

3. The card connector as claimed in claim 2, wherein a pair of openings is opened in the fool-proofing board and transversely arranged behind the inserting mouth, a front sidewall of each opening protrudes rearward to form a supporting block with a top face thereof inclining downward from front to rear, a buckling rib protrudes upward from a middle of the top face of the supporting block and extends longitudinally to further project rearward into the opening, the top plate of the shielding shell is die-cut downward to form a pair of buckling slices slanting against the top faces of the supporting blocks respectively, each of the buckling slices defines a buckling hole, the buckling rib stretches in the corresponding buckling hole and is adapted for buckling with the buckling hole to avoid mis-inserting the cards in the card connector.

4. The card connector as claimed in claim 3, wherein a pair of positioning bumps protrudes on the two opposite sides of the bottom wall of the receiving chamber, the two opposite side edges of the fool-proofing board define two positioning gaps for holding the positioning bumps therein so as to position the fool-proofing board in the receiving chamber when the fool-proofing board is pressed downward in the receiving chamber by the SIM card.

5. The card connector as claimed in claim 1, wherein the fool-proofing device further includes a strengthening plate made of solid metal material and integrated in the fool-proofing board to strengthen the strength of the fool-proofing board.

6. The card connector as claimed in claim 1, wherein the lifting member has a fastening portion of a substantially long strip shape, and two free ends thereof are curved upward to form a pair of the elastic portions, the fastening portions are molded in the base board, the two opposite sides of the bottom wall of the receiving chamber respectively define a pair of receiving fillisters for receiving the corresponding elastic portions therein when the fool-proofing board is pressed in the receiving chamber.

7. The card connector as claimed in claim 1, wherein the ejection device has an ejection portion stretching sideward in the receiving space, the ejection portion resists against a back of the fool-proofing board or a back of the SIM card so as to eject the micro SIM card out of the card connector by virtue of the fool-proofing board or eject the SIM card out of the card connector directly.

8. The card connector as claimed in claim 1, wherein the shielding shell has a top plate covered on the insulating housing, and two side plates extending downward from two opposite side edges of the top plate to abut against two opposite outer sides of the side walls, a front edge of one side of the top plate protrudes downward to form a holding plate resisting against a front end of the one side wall, the two opposite outer sides of the side walls and the front end of the one side wall protrude outward to form a plurality of fastening blocks, a plurality of fastening holes is opened in the side plates and the holding plate for buckling the corresponding fastening blocks therein.

* * * * *